United States Patent
Harris et al.

(12) 
(10) Patent No.: US 11,568,041 B2
(45) Date of Patent: Jan. 31, 2023

(54) SECURE AUTHENTICATION FOR YOUNG LEARNERS

(71) Applicant: Pearson Education, Inc., Bloomington, MN (US)

(72) Inventors: Nathan Harris, London (GB); Stefan Hill, Kent (GB); Claudio Parisi, London (GB)

(73) Assignee: PEARSON EDUCATION, INC., Bloomington, IL (US)

( * ) Notice: Subject to any disclaimer, the term of this patent is extended or adjusted under 35 U.S.C. 154(b) by 0 days.

(21) Appl. No.: 17/135,559

(22) Filed: Dec. 28, 2020

(65) Prior Publication Data

US 2022/0207131 A1   Jun. 30, 2022

(51) Int. Cl.
| | |
|---|---|
| *G06F 21/46* | (2013.01) |
| *G06F 21/36* | (2013.01) |
| *H04L 9/32* | (2006.01) |
| *H04L 29/06* | (2006.01) |
| *G06F 3/0482* | (2013.01) |
| *H04L 9/40* | (2022.01) |

(52) U.S. Cl.
CPC ............ *G06F 21/46* (2013.01); *G06F 3/0482* (2013.01); *G06F 21/36* (2013.01); *H04L 9/3236* (2013.01); *H04L 63/083* (2013.01)

(58) Field of Classification Search
CPC ........ G06F 21/46; G06F 3/0482; G06F 21/36; H04L 9/3236; H04L 63/083
See application file for complete search history.

(56) References Cited

U.S. PATENT DOCUMENTS

| | | |
|---|---|---|
| 6,978,472 B1 | 12/2005 | Nashida et al. |
| D540,340 S | 4/2007 | Cummins |
| D590,415 S | 4/2009 | Ball et al. |
| 7,600,189 B2 | 10/2009 | Fujisawa |
| D650,791 S | 12/2011 | Weir et al. |
| D664,550 S | 7/2012 | Lee et al. |
| D695,780 S | 12/2013 | Edwards et al. |
| D695,781 S | 12/2013 | Edwards et al. |
| D710,879 S | 8/2014 | Elston et al. |
| D712,913 S | 9/2014 | Na |
| 8,881,251 B1 * | 11/2014 | Hilger ................ H04L 63/083 726/19 |
| D732,562 S | 6/2015 | Yan et al. |
| 9,460,068 B2 | 10/2016 | Kokemohr |

(Continued)

OTHER PUBLICATIONS

Huber, Amanda, Pearson Realize Student Login, Aug. 22, 2016, retrieved Jun. 24, 2022, https://www.youtube.com/watch?v=LxpA_vpUK1s (Year: 2016).

*Primary Examiner* — Tadesse Hailu
*Assistant Examiner* — Darrin Hope
(74) *Attorney, Agent, or Firm* — Quarles & Brady LLP

(57) ABSTRACT

Systems and methods of the present invention provide for: storing a correlation table including images and associated strings, and a secure password table; generating a GUI, displayed on a client computer and including GUI components for visual authentication; receiving a selection of a component; updating the GUI with a menu of images associated with the selected component; receiving a selection of one of the images; identifying an associated string as an authentication string; and storing the authentication string as a secure password in the password table.

12 Claims, 18 Drawing Sheets

(56) References Cited

U.S. PATENT DOCUMENTS

| | | | |
|---|---|---|---|
| D813,267 S | 3/2018 | Alonso et al. | |
| D820,878 S | 6/2018 | Sun et al. | |
| D826,979 S | 8/2018 | Rowny et al. | |
| D828,383 S | 9/2018 | Liao et al. | |
| D879,123 S | 3/2020 | Rydgren et al. | |
| 10,958,878 B2 | 3/2021 | Frenette et al. | |
| D926,791 S | 8/2021 | Liu et al. | |
| 2006/0021024 A1* | 1/2006 | Park | G06F 21/36 726/17 |
| 2007/0250920 A1* | 10/2007 | Lindsay | G06F 21/31 726/7 |
| 2008/0010585 A1 | 1/2008 | Schneider et al. | |
| 2008/0214298 A1* | 9/2008 | Byng | A63F 13/79 463/29 |
| 2011/0096997 A1* | 4/2011 | Marciszko | G06F 21/36 382/218 |
| 2013/0179777 A1 | 7/2013 | Cassistat et al. | |
| 2014/0372754 A1* | 12/2014 | Aissi | H04L 9/0861 713/168 |
| 2015/0256343 A1* | 9/2015 | Graveman | G06F 21/30 713/183 |
| 2019/0080331 A1* | 3/2019 | Howald | G06Q 20/388 |

\* cited by examiner

Draw your character and click 'Sign in'

1. Select your character

Sign in

2. Select your three accessories

SECURE AUTHENTICATION FOR YOUNG LEARNERS

FIELD OF THE INVENTION

This disclosure relates to the field of user authentication, and specifically relates to systems and methods configured to receive a selection of visual components used for authentication, which are then correlated with an alphanumeric string, and converted into a secure authentication for a user.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to: store a correlation table including images and associated strings, and a secure password table; generate a GUI, displayed on a client computer and including GUI components for visual authentication; receive a selection of a component; update the GUI with a menu of images associated with the selected component; receive a selection of one of the images; identify an associated string as an authentication string; and store the authentication string as a secure password in the password table.

The above features and advantages of the present invention will be better understood from the following detailed description taken in conjunction with the accompanying drawings.

DETAILED DESCRIPTION

Figure 1:
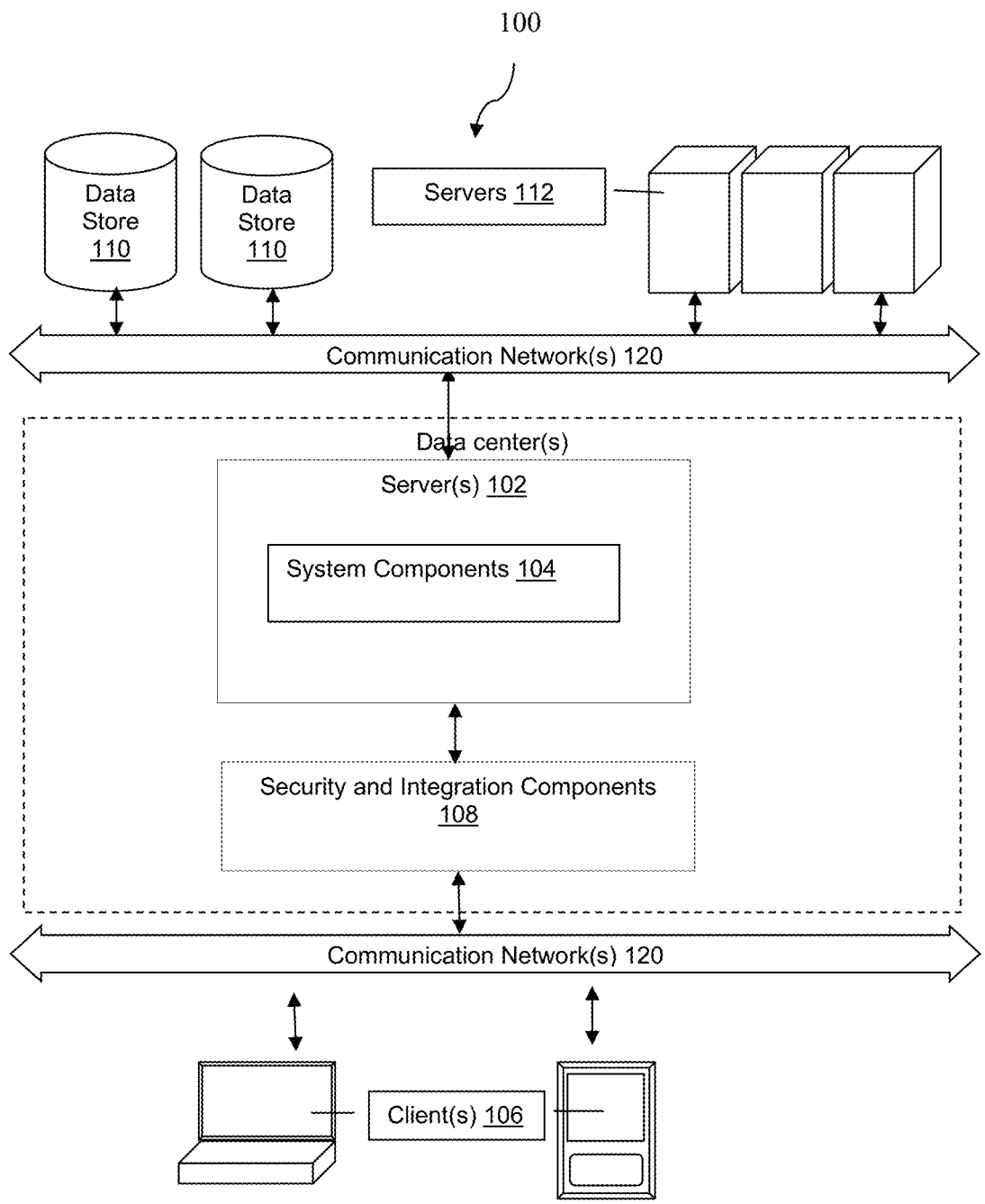
FIG. 1 illustrates a system level block diagram for secure authentication of young learners.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Young learners who are also users of digital systems (referred to generally as young learners herein) often find it cognitively challenging to remember passwords. To simplify the task of remembering passwords, many young learners may create simple passwords (e.g. 'cat1') that create security concerns for the system. Some young learners may print out and carry around printouts of their authentication information, which also creates a security risk related to keeping the login and password, or other authentication information, confidential.

To overcome these security risks and concerns, the disclosed embodiments provide age-appropriate means for young learners to authenticate themselves to a digital system, removing the cognitive load of having to remember an alphanumeric password, as well as removing the security concerns and risks caused by overly-simple passwords, or printing authentication information. In these embodiments, the young learner user controls a graphical user interface (GUI) to assemble a cartoon avatar from a range of components such as the character/avatar itself, arms, legs, a body, a head, features for the body or head (e.g., arms, legs, eyes, mouth) various accessories (e.g., a hat, a tie, etc.) and characteristics for the character or accessories (e.g., color for the hat or tie, etc.). The character or avatar is then defined as a visual password, and each component of this visual password is then automatically translated, within a back-end system, into a corresponding sequence of characters, which are then converted/realized into a complex and secure password.

The core function of the disclosed system is therefore enabling user account creation and authentication for learning applications. Specifically, the disclosed embodiments include means for young learners to authenticate themselves to a digital system, without requiring or depending on the young learners' ability to read or write. The disclosed embodiments also represent an active approach of encouraging young learners to be securely authenticated to a digital system before they have the cognitive capabilities referred to above.

The disclosed embodiments represent a significant improvement over the prior art. Specifically, the disclosed embodiments represent an enhanced ease of use for young users to authenticate to and access digital systems, using a uniquely usable and intuitive user interface for young users. This increases the independent accessibility of digital learning tools to young learners. The disclosed embodiments allow young learners to access learning content, do not require assistance or involvement by a parent or guardian, and provide a similar level of security to a complex password, without making inappropriate cognitive demands of young users. The modular nature of the disclosed embodiments also allows for the disclosed system to exist within a self-contained software application, and/or to exist as one or more software modules that may be integrated into any existing authentication system.

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone network (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
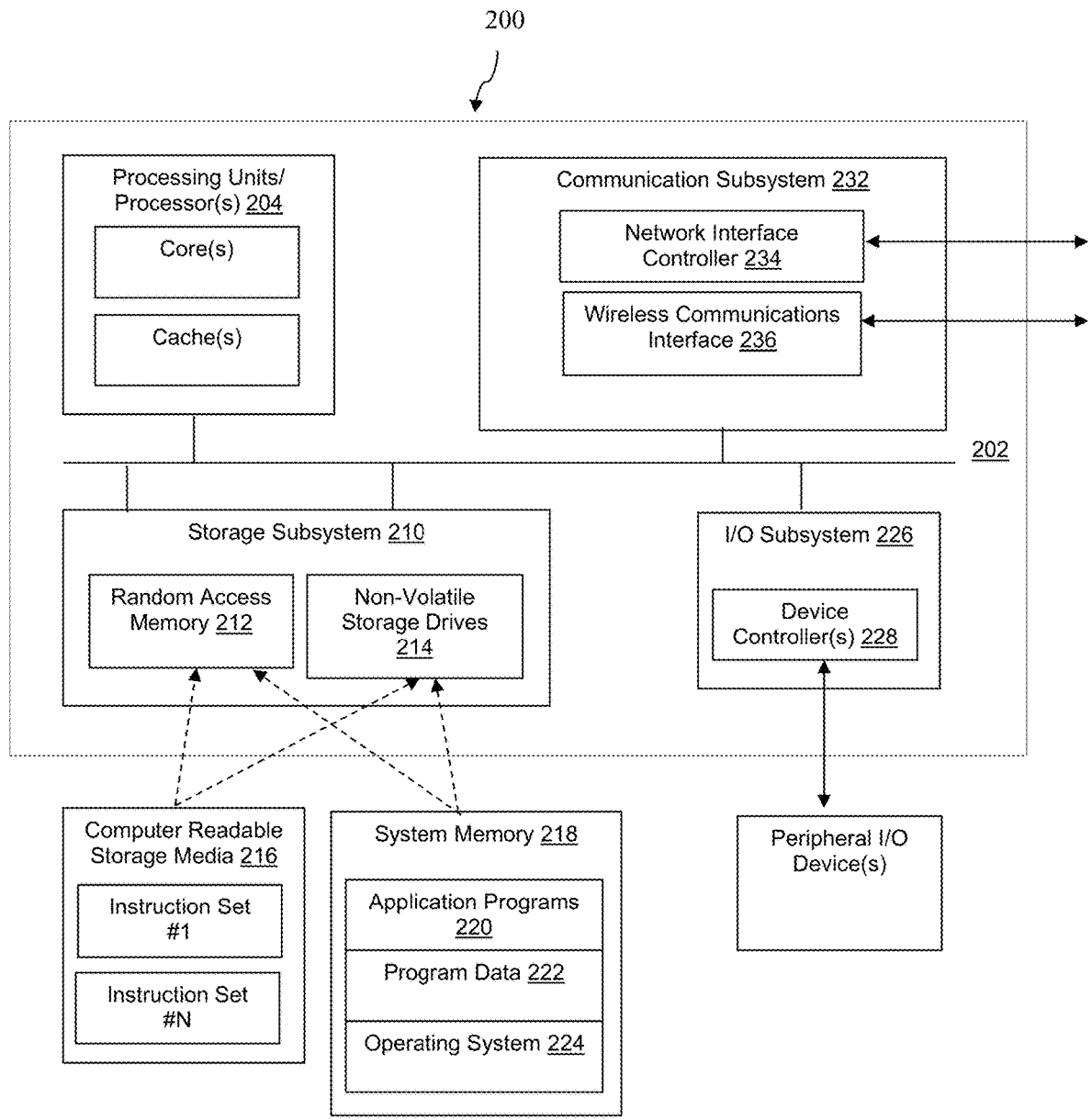
FIG. 2 illustrates an additional system level block diagram for secure authentication of young learners.

The embodiments shown in FIGS. 1-2 are thus one example of a distributed computing system and are not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a Fire-Wire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

As noted above, the disclosed embodiments provide an age-appropriate means for young learner users to authenticate themselves to a digital system, removing the cognitive demands of having to remember an alphanumeric password. In these embodiments, the young learner controls a GUI to assemble a cartoon avatar from a range of components (for example, arms, legs, a body, a head, various accessories and characteristics of those accessories, etc.). Using these graphical components, the character is then translated, within a back-end system, into a visual password, with each component corresponding to a sequence of alphanumeric characters. The system then automatically generates a complex and secure password, using the selected character and accessories, and their corresponding sequence of characters.

As a result, instead of using a keyboard to enter an alphanumeric password, the young learners select an avatar (e.g., the selected cartoon character) and then equip the character with two or more accessories. The combination of avatar and accessories (and any characteristics of the avatar and accessories), once translated into a secure alphanumeric password, provides for similar complexity to a standard secure password. Given the modular nature of the disclosed embodiments, this complex and secure password may be used in a software application such as that disclosed herein, but also may be used in any software application that requires authentication. In other words, the complex and secure password, once generated, may be compatible with any known user authentication system. However, unlike typical alphanumeric passwords, young learners find this approach much more engaging and easier to remember than a standard alphanumeric password.

In some embodiments, in steps preceding the selection or use of the visual password, the user may be asked to select the first letter of his or her first name in order to identify their user account or profile. The system may then display a list of the first names enrolled in the class or school, beginning with that letter, along with multiple 'dummy' or 'distractor' names, which are not linked to real users, in order to enhance security. In some embodiments, a second, similar step may prompt selection of the young learners' family name from a list, before the visual password is selected or entered. A core feature and function of the disclosed embodiments is therefore authentication, and the disclosed embodiments present a uniquely usable and intuitive way for young users to authenticate to digital systems, while providing means for any password generated by the disclosed embodiments to be compatible with existing user authentication systems.

The disclosed embodiments also represent a significant improvement over the prior art, allowing enhanced ease of access for young users, thereby increasing the independent accessibility of digital learning tools for children. As a result, young learners are able to actively and securely authenticate themselves to a digital system in order to access learning content in a way that does not depend on inappropriate cognitive demands on the young learners, such as their ability to read or write, and without the involvement of a parent or guardian, thereby allowing them to securely authenticate to digital systems before those cognitive abilities are present, while also providing a similar level of security to complex passwords in existing authentication systems.

The disclosed system may include at least two database tables, used to store at least a portion of the data required for the disclosed system, and possibly used as lookup tables for server 112 to lookup values required for the disclosed embodiments. This multi-table system represents a significant improvement over existing systems, creating more efficiency, by requiring the creation of as little as two tables within the database 110: a first image/string correlation table 300 creating a mapping between selected images and/or image components and the strings used to automatically generate segments used in password generation, and a second, secure password table 305, which stores the password after being generated.

Figure 4:
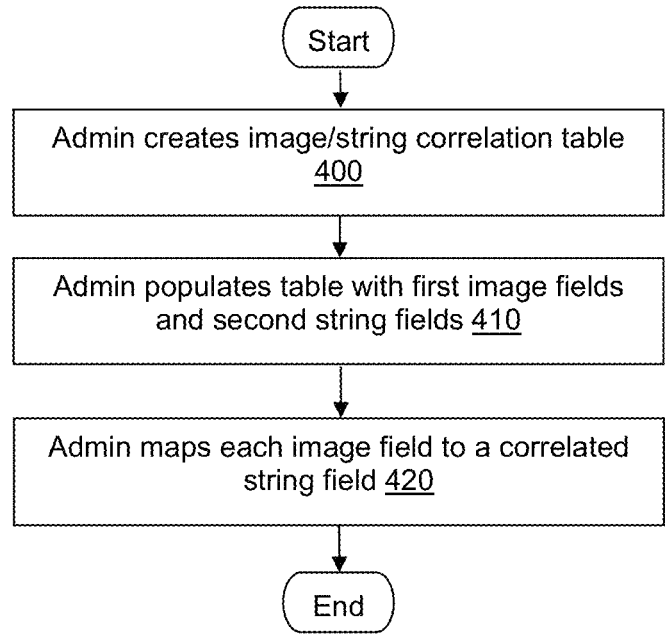
FIG. 4 illustrates a flow diagram for creating an image/string correlation table used for the secure authentication of young learners.
Figure 5:
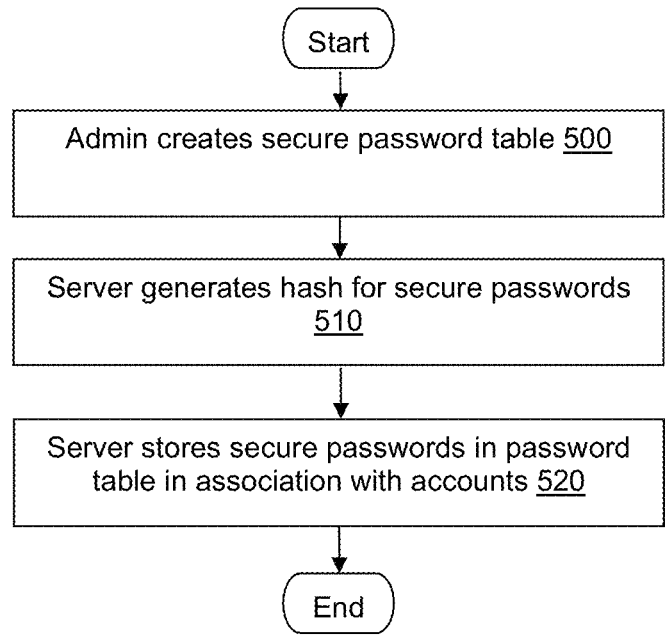
FIG. 5 illustrates a flow diagram for creating a secure password table and storing a secure password within the secure password table used for the secure authentication of young learners.

Turning now to FIGS. 4 and 5, a system administrator (e.g., a software developer for the disclosed system, or other software or system administrator), may create the image/string correlation table 300, and the secure password table 315. In step 400 of FIG. 4, the system administrator may create the image/string correlation table 410, and in step 410, the system administrator may populate the image/string correlation table 300 with images and strings. For example, the system administrator may populate an image field 305 with images or other graphics representing character, avatars, and/or components with different characteristics (e.g., colors) to be used in selecting various components used in the creation of a character or avatar used by the young learner as a login or password, as described below. Step 410 may further include the system administrator populating string fields 310 with an alphanumeric string associated with each of the associated images in the table (e.g., each image field 305 may be associated with an alphanumeric string field 310 within a common database record).

In step 420, the system administrator, and/or system software logic, may map each image field 305 with an alphanumeric string field 310, so that the database or the system logic includes, possibly within the image/string correlation table 300 itself, a correlation between each image and an associated alphanumeric string, thereby creating lookup values mapped from the images to the password/password components described below. In some embodiments, the system administrator may create backend instructions (e.g., software) mapping each of the components in the database (e.g., the avatar, a bow tie, a hat, etc. described below) to a complex series of letters and numbers, thereby providing almost limitless potential combinations of complex password components.

Turning now to FIG. 5, step 500, the system administrator may further generate a second, password table 310, including a secure database of passwords, which have been generated by the lookup between the images and password/password components, and converted into a secure password, usable by the disclosed or other user authentication systems, as described below.

In some embodiments, a third user account/profile table 325 may be created, storing data about an account or profile for each of the young learner users. As a non-limiting example, each record in the account/profile table 325 may include a username for each of the users that will use the system, and each of the usernames may be stored in association with a password in the password table. Each record may include additional information about each user, such as young learners' first and last/family names, learning course information, teacher, assessment/performance data, etc.

In some embodiments, the disclosed system may store a library of first names, which may be used in the generation of a menu of usernames, including 'dummy' or 'distractor' usernames, from which the young learner user may select, as described in more detail below.

The disclosed system may further include one or more software modules configured to provide an instructor administration dashboard 330 for the instructor of a learning course for young learners. As non-limiting examples, this instructor dashboard may provide access to data for each of the young learners with account/profile information relating to the learning course taught by the instructor. This data may include, as non-limiting examples, each young learner's first and last names, performance data reflecting how each young learner is performing in the learning course, the associated username and password data associated with each young learner's account/profile 325, and the like.

In some embodiments, the instructor administration dashboard 330 may further include administrative functions, such as allowing the instructor to reset the character/avatar associated with one or more accounts or profiles. While some embodiments may include features such as password hints, the instructor may want to oversee password resets and the like.

The instructor administration dashboard 330 may further include displays of various instructions for the instructor, allowing the instructor to oversee activity within the disclosed embodiments. For example, in some embodiments, the instructor administration dashboard 330 may provide instructions on the instructor's responsibility, and how to deal with various issues. In one example, the instructor may use the instructor administration dashboard 330 to oversee issues, and prevent internal or external penetration of the system, possibly through 'social media' issues.

For example, the instructor may recognize that several of the young learners are using the same character/avatar, accessories, and/or features of these avatars. The teacher may recognize a trend in which young learners may access each other's accounts/profiles (i.e., trying to guess each other's 'passwords'), and therefore may use the instructions and administrative capabilities to reset the characters/avatars associated with various accounts. However, it should also be noted that the disclosed embodiments include protections built-in against such security concerns, such as multiple variations provided by the character, the accessories, and the additional variations in features. The odds of selecting the same character, accessories, and/or features (e.g., hats, ties), in a range of characteristics (e.g., colors), is very unlikely to be the same between the users. It is therefore likely that there is at least one difference between each of the young learners' profiles.

One or more software modules in the disclosed embodiments may be modular. The software modules described herein may exist as an independent software, or may also exist as a feature within another software. For example, the embodiments disclosed herein may exist within a desktop learning application or mobile learning application, or may exist as a stand-alone desktop or mobile learning application, or may exist within, or in conjunction with, other software that requires user authentication (e.g., a browser plugin). However, in all embodiments, any combination of the capabilities described herein may exist.

Figure 3:
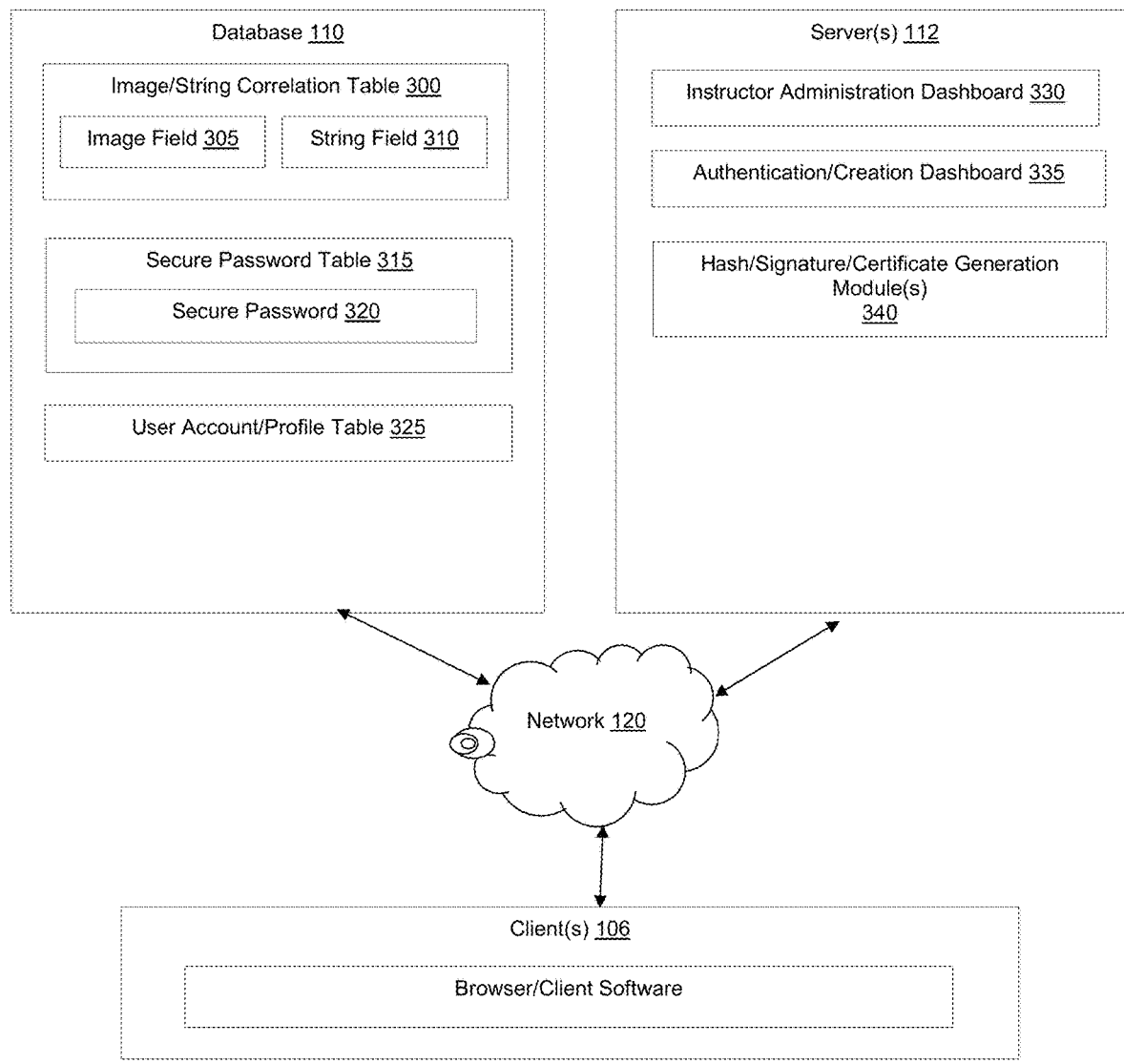
FIG. 3 illustrates a more detailed view of system components within a system level block diagram for secure authentication of young learners.

Using the data and the software modules or other components described above, server 112 may execute instructions within memory to generate a user interface for young learners, in which they can first, create a password, and then access a learning system or other available software by selecting or recreating their password as an authentication to the disclosed system, or within other systems. It should be noted that the disclosed embodiments refer to server 112. However, it should be further understood that the method steps disclosed herein may be accomplished using any combination of system components disclosed in association with FIGS. 1-3, and reference to server 112 is referred to herein only in the interest of simplicity.

Using the instructor administration dashboard 330 on an instructor client device 106, the instructor of the learning course may input young learner data into the disclosed system, including a first name and a last name and additional profile data for each of the young learners in a learning course. The client device 106 may transmit the young learner data through network 120 to server 112, which may store the young learner data in user account/profile table 325.

The young learners may then access the disclosed system via client devices 106. Server 112 may use one or more user authentication/authentication creation software modules to generate an authentication creation dashboard 335, which may be displayed to the young learners on the client device 106.

Figure 6:
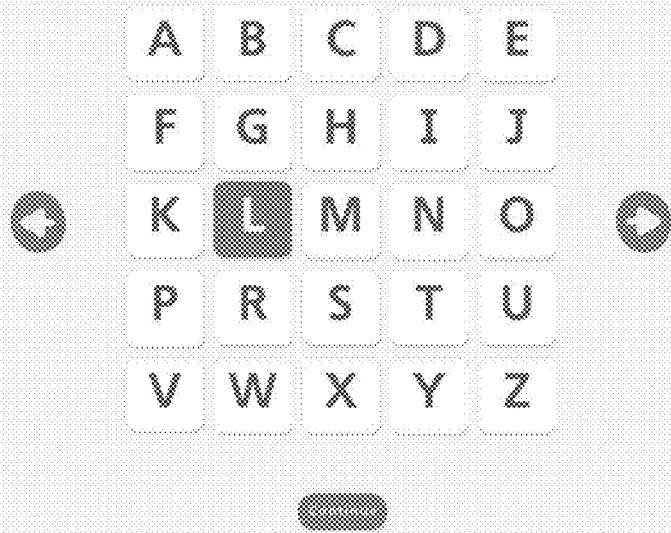
FIG. 6 illustrates a non-limiting example user interface allowing a user to select a letter associated with a first/user name, used for the secure authentication of young learners.
Figure 7:
FIG. 7 illustrates a non-limiting example user interface allowing a user to select a first/user name from a menu, used for the secure authentication of young learners.
Figure 8:
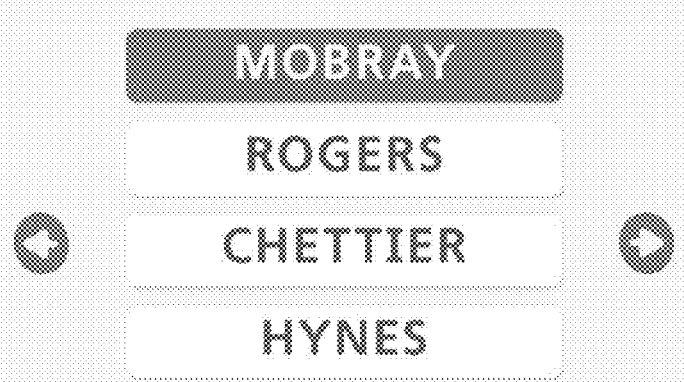
FIG. 8 illustrates a non-limiting example user interface allowing a user to select a last name from a menu, used for the secure authentication of young learners.

As seen in FIGS. 6-8, each young learner may identify themselves within the disclosed system by identifying themselves and their associated account/profile. To accomplish this, server 112 may generate a GUI, or series of GUIs, from which the young learner may select their username from a menu of available usernames based on recognition, since it has been shown that young learners recognize their name at a very young age. As a preliminary step, as seen in FIG. 6, server 112 may generate a GUI including all letters of the alphabet, and display the menu of letters to a young leaner, instructing them to select a letter for their first name. The young learner may select the letter associated with their first name, which may then be transmitted through network 120 to server 112.

Server 112 may select from the account/profile table 325 all first names that begin with the selected letter, and generate a GUI including each of the names associated with the selected letter. As an added measure of security server 112 may also generate one or more additional 'dummy' or 'distractor' names from the library of names, and add these names to the list of names within the GUI. Server 112 may then generate a selectable menu from which the user may select their first name, as seen in FIG. 7, and transmit the GUI to the young learner client device 106.

The young learner may select their name from the menu of names, and transmit it to server 112, which may identify the associated user account/profile. In some embodiments and/or in embodiments in which a user shares a first name with another young learner in the learning course, server 112 may select each surname or family name from the user accounts/profiles, and generate a second menu, seen in FIG. 8, allowing the young learner to select their surname or family name from a menu of surnames or family names, to confirm their identity and/or user account/profile.

Figure 9A:
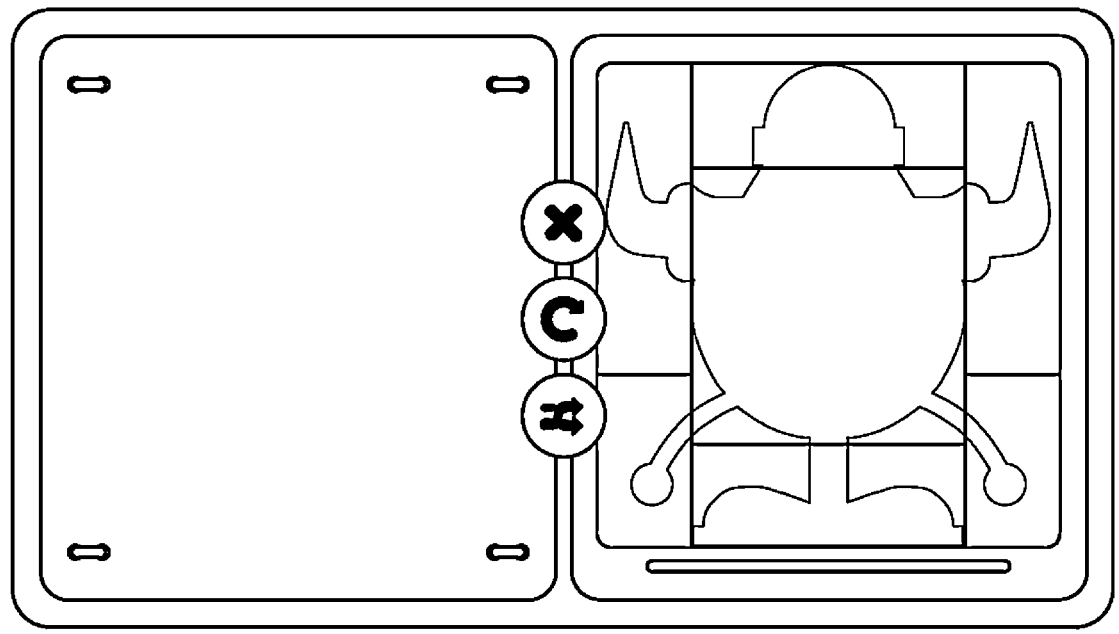
FIG. 9A illustrates a non-limiting example user interface allowing a user to select a head component from a menu of components for a visual authentication, used for the secure authentication of young learners.
Figure 9B:
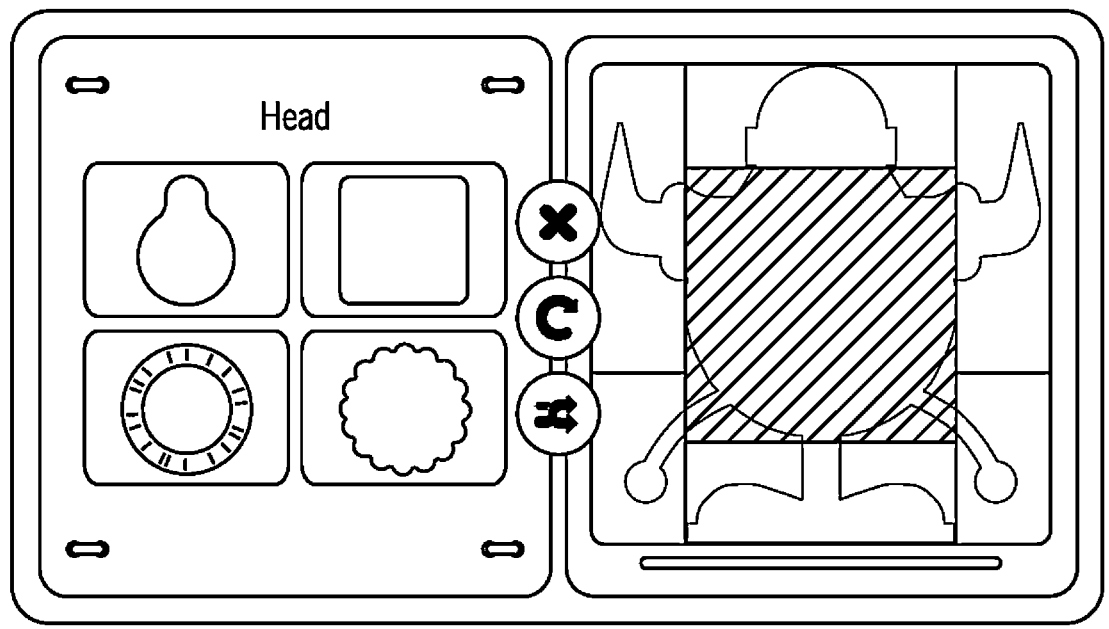
FIG. 9B illustrates a non-limiting example user interface allowing a user to select a head image from a menu of head images for a visual authentication, used for the secure authentication of young learners.
Figure 9C:
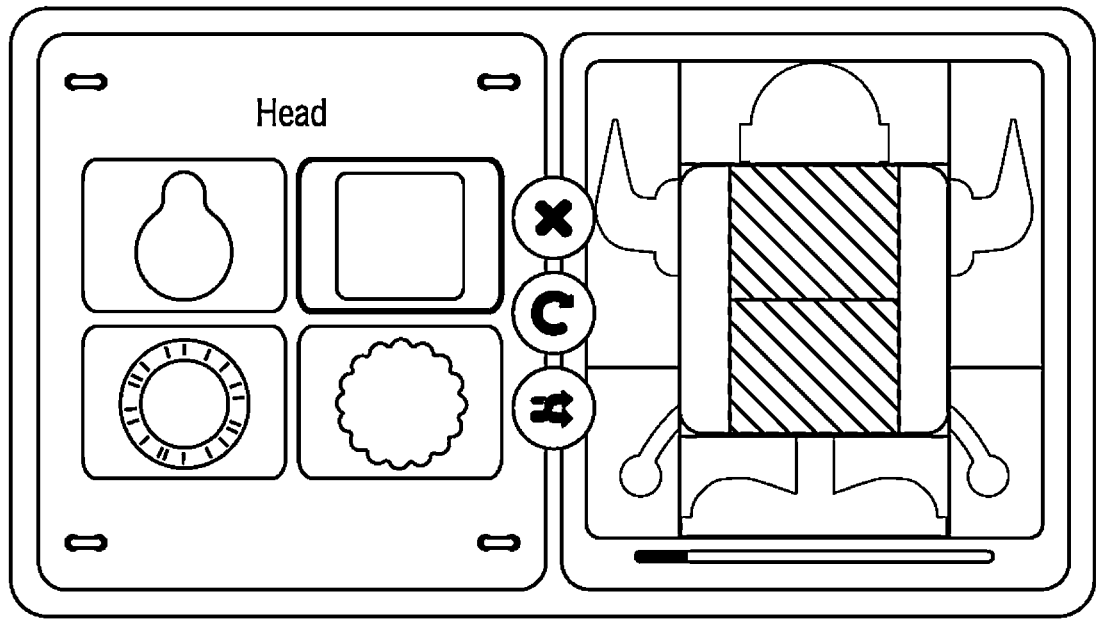
FIG. 9C illustrates a non-limiting example user interface allowing a user to select components for a head component from a menu of components for a visual authentication, used for the secure authentication of young learners.
Figure 9D:
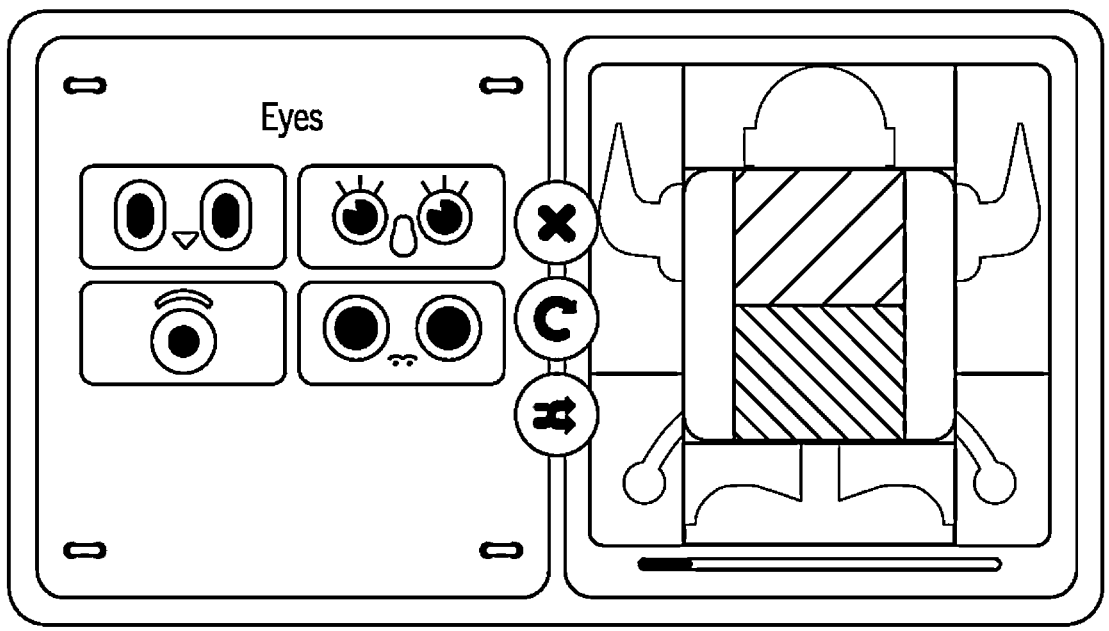
FIG. 9D illustrates a non-limiting example user interface allowing a user to select an eyes component from a menu of components for a visual authentication, used for the secure authentication of young learners.
Figure 9E:
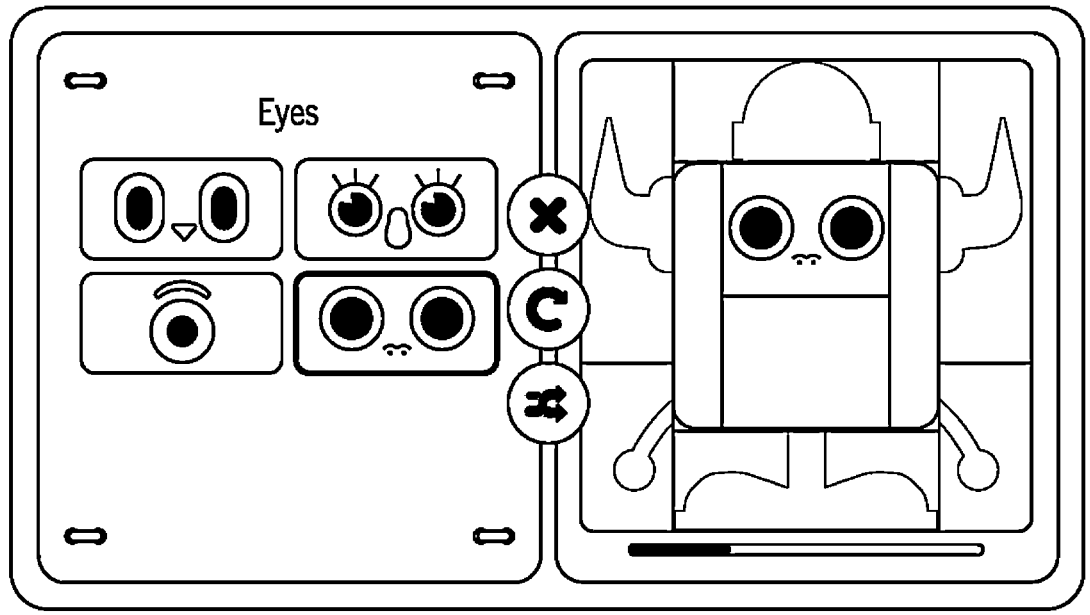
FIG. 9E illustrates a non-limiting example user interface allowing a user to select an eyes image from a menu of eyes images for a visual authentication, used for the secure authentication of young learners.
Figure 9F:
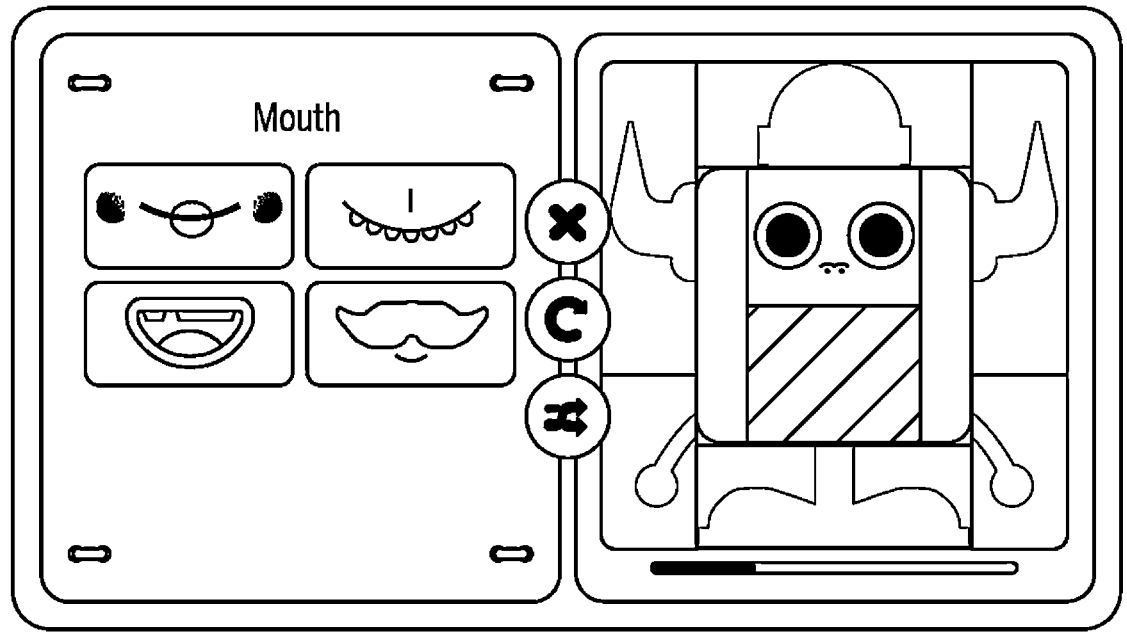
FIG. 9F illustrates a non-limiting example user interface allowing a user to select a mouth component from a menu of components for a visual authentication, used for the secure authentication of young learners.
Figure 9G:
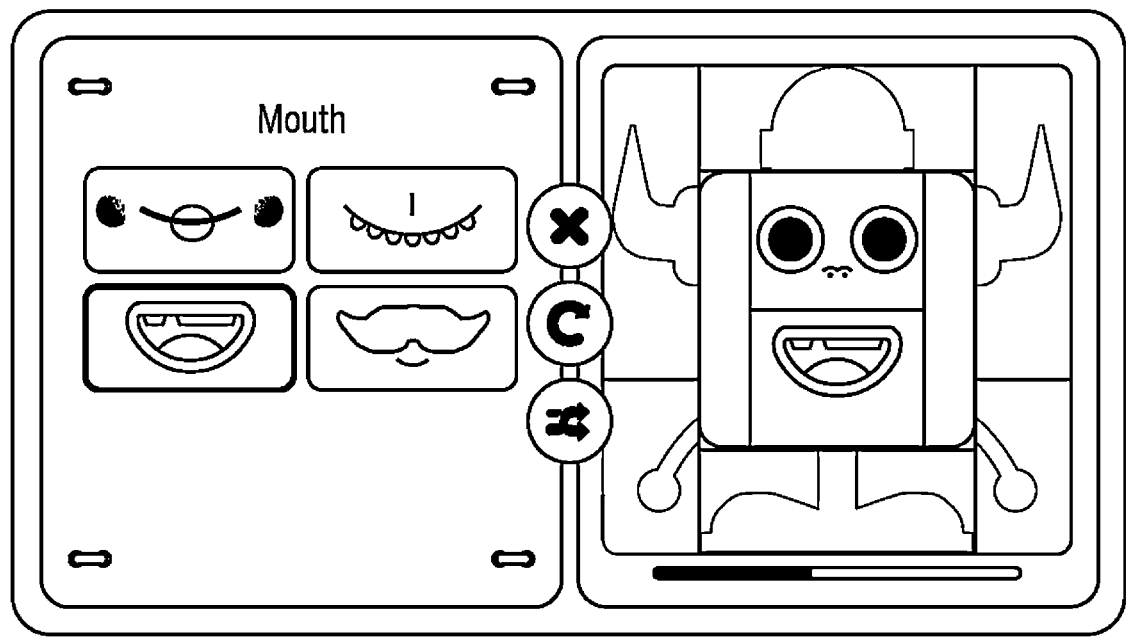
FIG. 9G illustrates a non-limiting example user interface allowing a user to select a mouth image from a menu of mouth images for a visual authentication, used for the secure authentication of young learners.
Figure 9H:
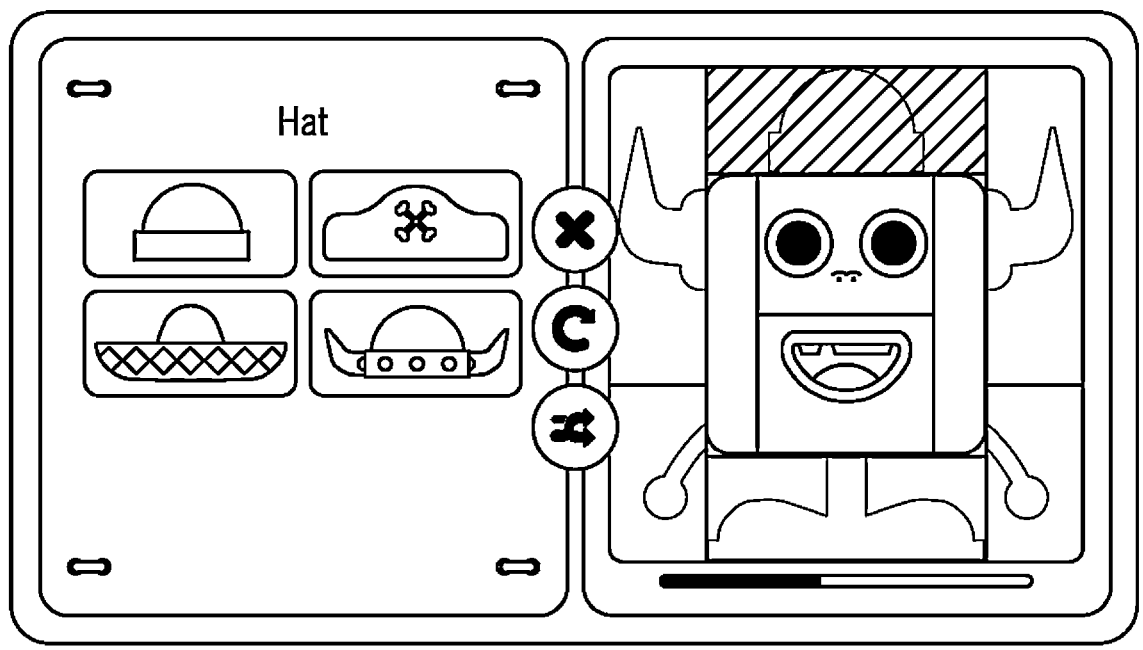
FIG. 9H illustrates a non-limiting example user interface allowing a user to select a hat component from a menu of components for a visual authentication, used for the secure authentication of young learners.
Figure 9I:
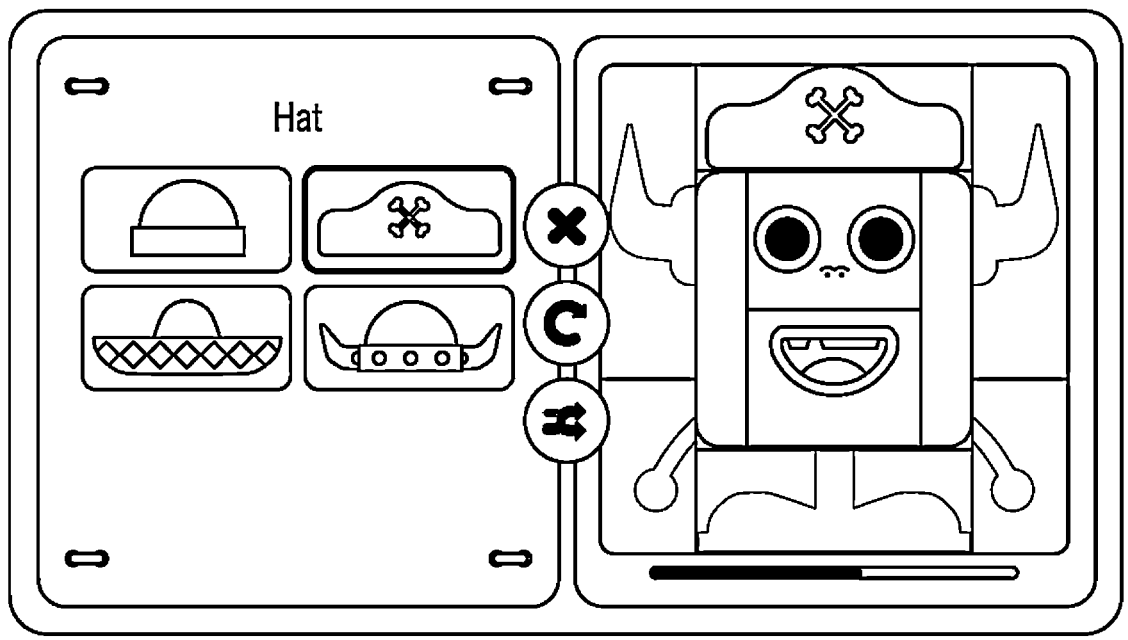
FIG. 9I illustrates a non-limiting example user interface allowing a user to select a hat image from a menu of hat images for a visual authentication, used for the secure authentication of young learners.
Figure 9J:
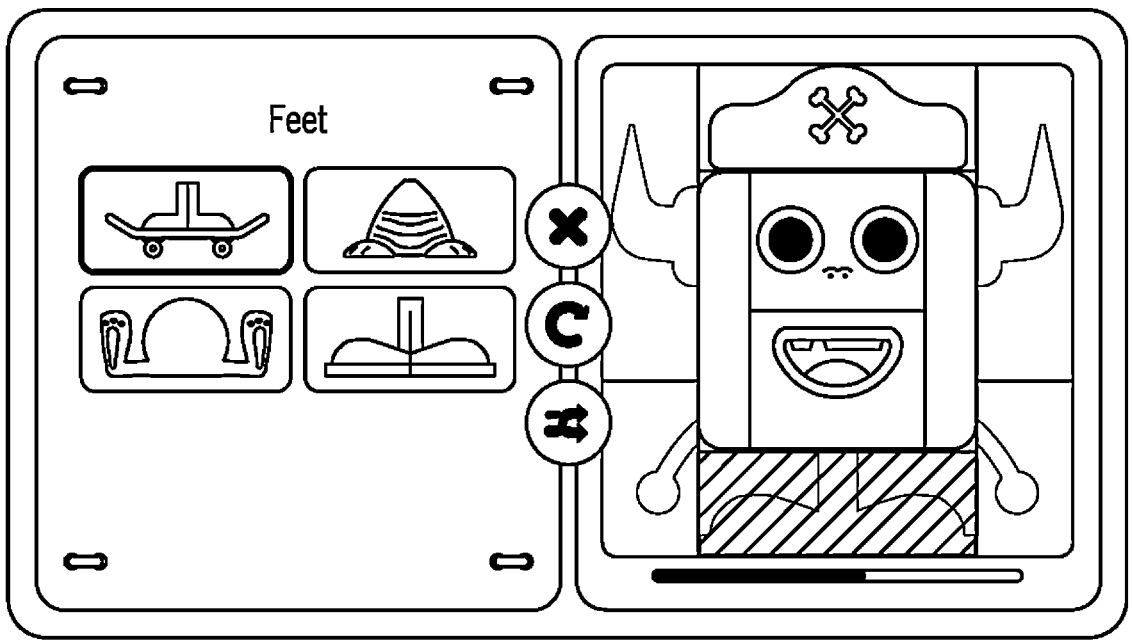
FIG. 9J illustrates a non-limiting example user interface allowing a user to select a feet component from a menu of components for a visual authentication, used for the secure authentication of young learners.
Figure 9K:
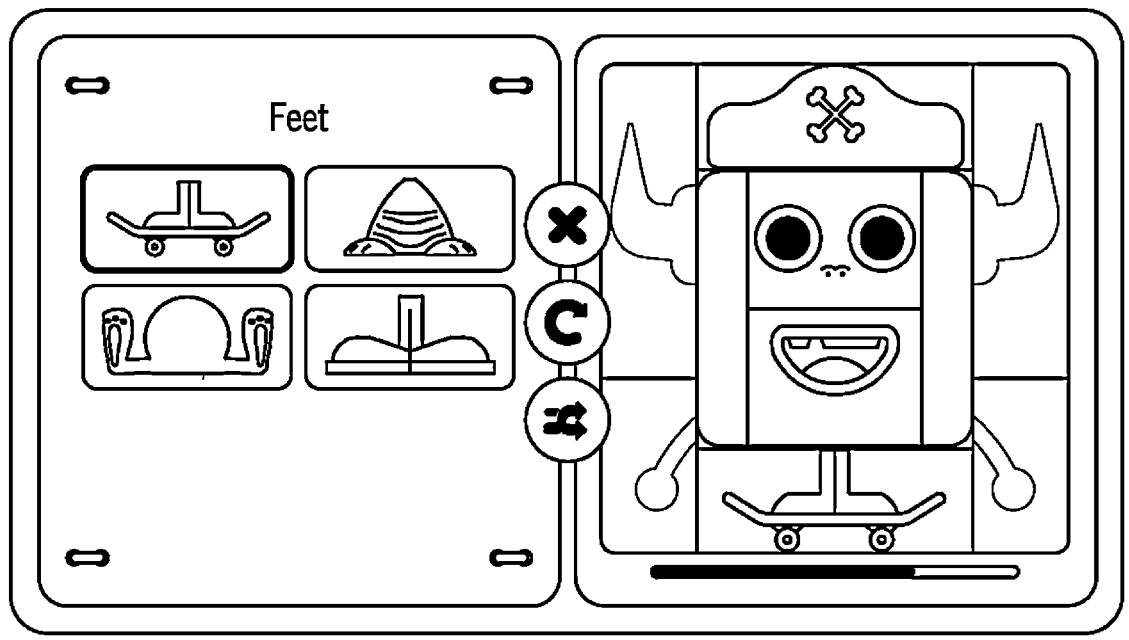
FIG. 9K illustrates a non-limiting example user interface allowing a user to select a feet image from a menu of feet images for a visual authentication, used for the secure authentication of young learners.
Figure 9L:
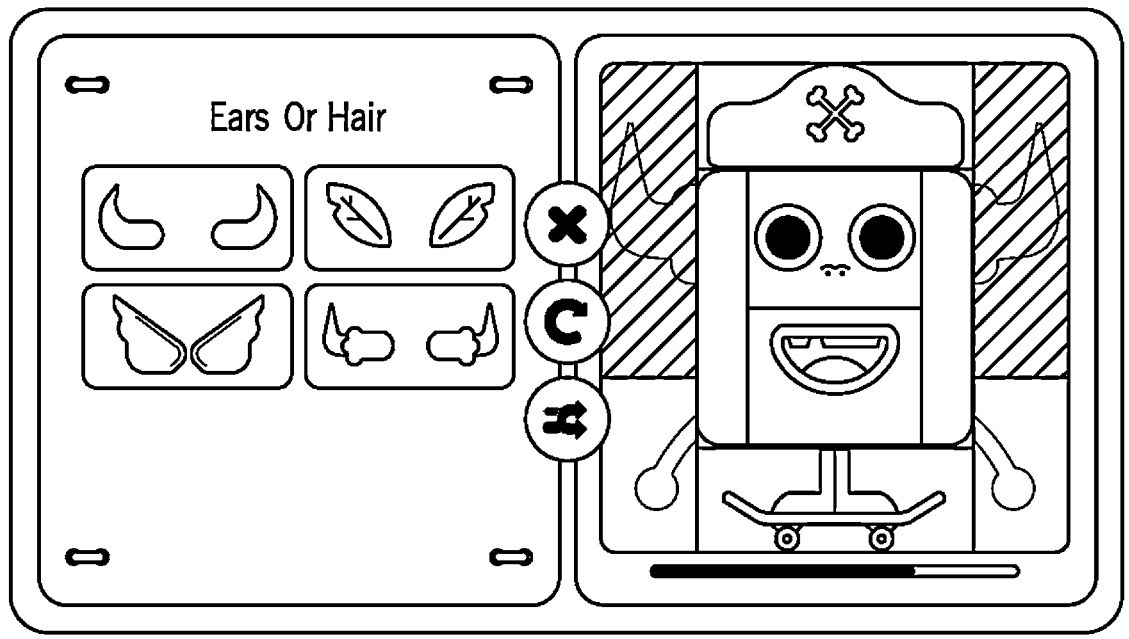
FIG. 9L illustrates a non-limiting example user interface allowing a user to select an ears or hair component from a menu of components for a visual authentication, used for the secure authentication of young learners.
Figure 9M:
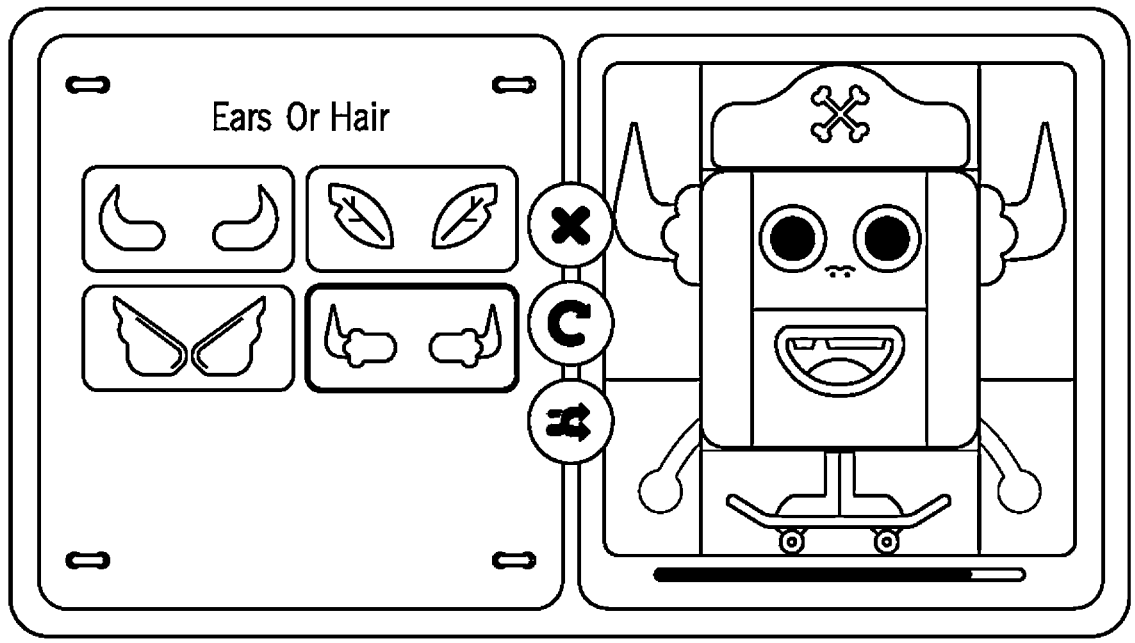
FIG. 9M illustrates a non-limiting example user interface allowing a user to select an ears or hair image from a menu of ears or hair images for a visual authentication, used for the secure authentication of young learners.
Figure 9N:
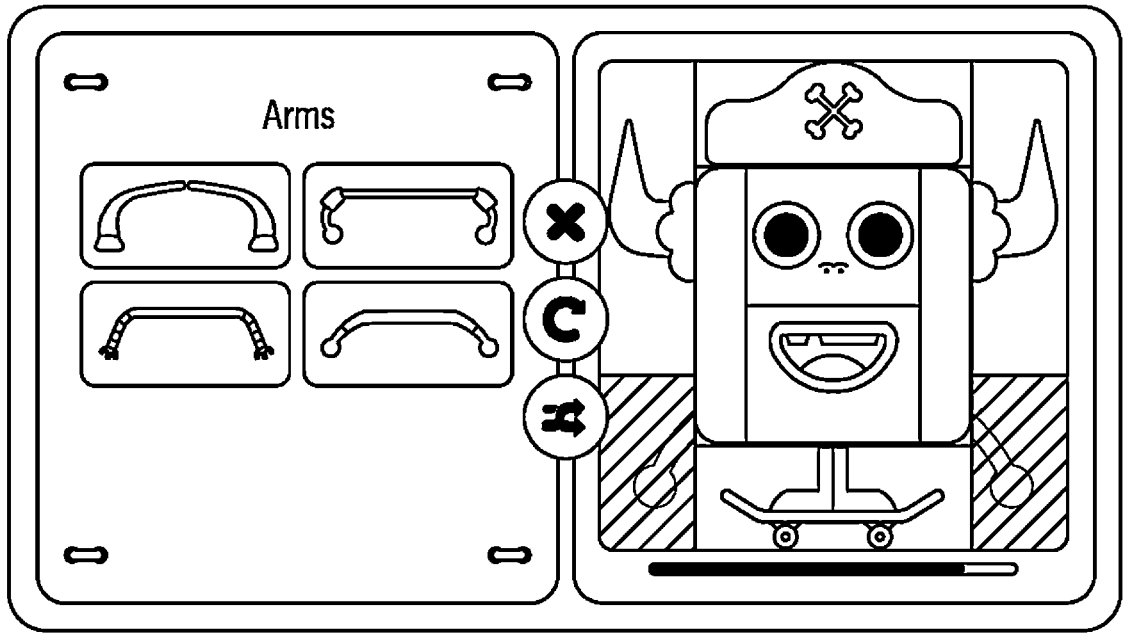
FIG. 9N illustrates a non-limiting example user interface allowing a user to select an arms component from a menu of components for a visual authentication, used for the secure authentication of young learners.
Figure 9O:
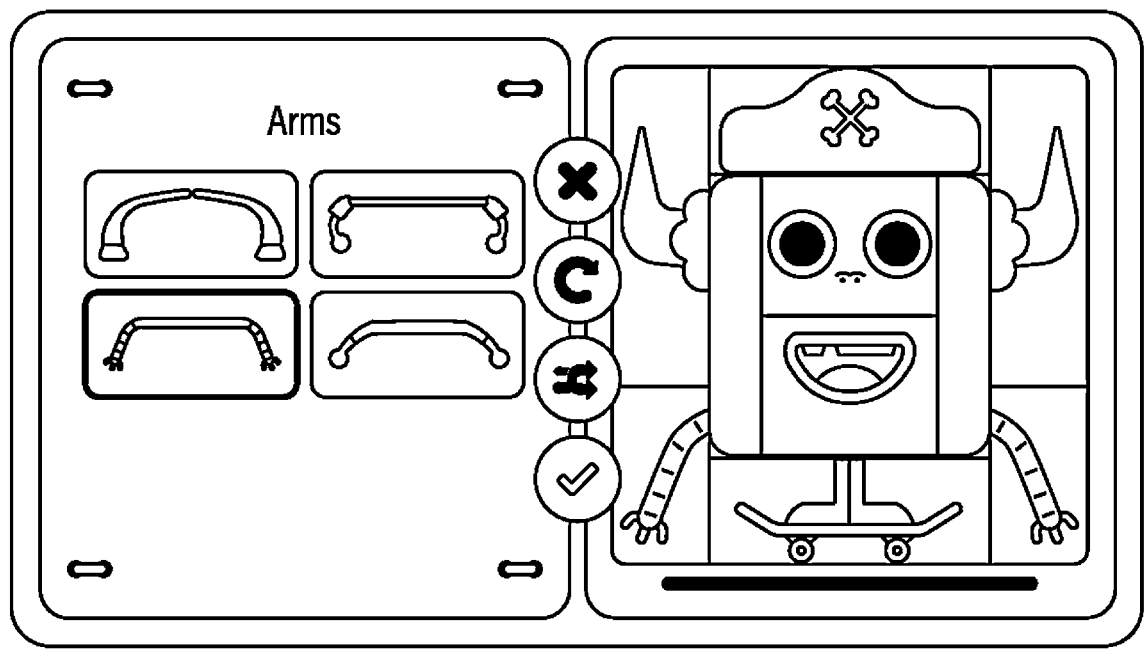
FIG. 9O illustrates a non-limiting example user interface allowing a user to select an arms image from a menu of arms images for a visual authentication, used for the secure authentication of young learners.
Figure 9P:
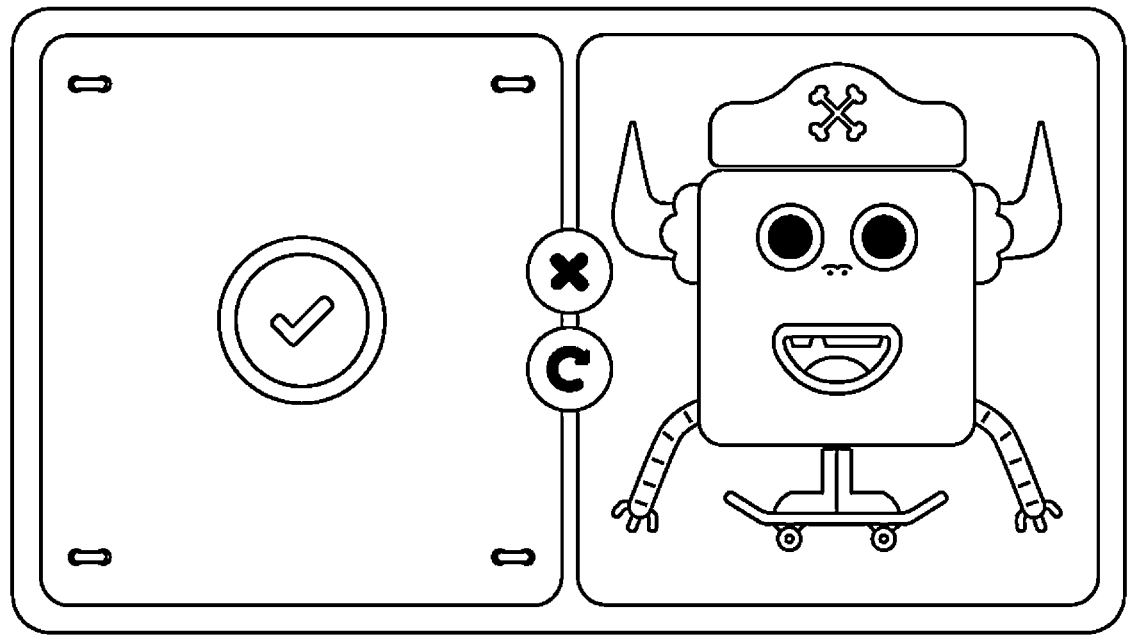
FIG. 9P illustrates a non-limiting example user interface confirming the completion of the visual authentication, used for the secure authentication of young learners.

Turning now to FIGS. 9A-9P, once the account/profile for the young learner has been identified, server 112 may then generate a series of GUIs for the young learner to select and define their character/avatar, including selection of various accessories and/or characteristics. To accomplish this, server 112 may generate authentication generation dashboard 335. As seen in FIG. 9A, this authentication generation dashboard 335 may include a template for the young learner's character/avatar, and a menu for selecting various accessories and/or defining various characteristics for the character/avatar and the accessories.

For example, in FIG. 9B, the young learner may select, within the displayed template, the head of the character. Server 112 may detect this selection, select all available head images from the image fields 305 in the records in the image/string data table 300, and generate a menu of available head images from which the young learner may select a head. Server 112 may then identify the string in the string field 110 in the data record associated with the image selected, and temporarily store that string within memory.

In FIGS. 9C-9E, server 112 may highlight the next feature to be selected, specifically, the eyes of the character. Server 112 may detect this selection, select all available eyes images from the image fields 305 in the records in the image/string data table 300, and generate a menu of available eyes images from which the young learner may select the character's eyes. Server 112 may then identify the string in the string field 110 in the data record associated with the image selected, and concatenate that string to the temporary string stored within memory. As seen in FIG. 9E, server 112 may then display the selected eyes.

In FIGS. 9F-9G, server 112 may highlight the next feature to be selected, specifically, the mouth of the character. Server 112 may detect this selection, select all available mouth images from the image fields 305 in the records in the image/string data table 300, and generate a menu of available mouth images from which the young learner may select the character's mouth. Server 112 may then identify the string in the string field 110 in the data record associated with the image selected, and concatenate that string to the temporary string stored within memory. As seen in FIG. 9G, server 112 may then display the selected mouth.

In FIGS. 9H-9I, server 112 may highlight the next feature to be selected, specifically, the hat of the character. Server 112 may detect this selection, select all available hat images from the image fields 305 in the records in the image/string data table 300, and generate a menu of available hat images from which the young learner may select the character's hat. Server 112 may then identify the string in the string field 110 in the data record associated with the image selected, and concatenate that string to the temporary string stored within memory. As seen in FIG. 9I, server 112 may then display the selected hat.

In FIGS. 9J-9K, server 112 may highlight the next feature to be selected, specifically, the feet of the character. Server 112 may detect this selection, select all available feet images from the image fields 305 in the records in the image/string data table 300, and generate a menu of available feet images from which the young learner may select the character's feet. Server 112 may then identify the string in the string field 110 in the data record associated with the image selected, and concatenate that string to the temporary string stored within memory. As seen in FIG. 9K, server 112 may then display the selected feet.

In FIGS. 9L-9M, server 112 may highlight the next feature to be selected, specifically, the ears or hair of the character. Server 112 may detect this selection, select all available ears or hair images from the image fields 305 in the records in the image/string data table 300, and generate a menu of available ears or hair images from which the young learner may select the character's ears or hair. Server 112 may then identify the string in the string field 110 in the data record associated with the image selected, and concatenate that string to the temporary string stored within memory. As seen in FIG. 9M, server 112 may then display the selected ears or hair.

In FIGS. 9N-9O, server 112 may highlight the next feature to be selected, specifically, the arms of the character. Server 112 may detect this selection, select all available arm images from the image fields 305 in the records in the image/string data table 300, and generate a menu of available arm images from which the young learner may select the character's arms. Server 112 may then identify the string in the string field 110 in the data record associated with the image selected, and concatenate that string to the temporary string stored within memory. As seen in FIG. 9O, server 112 may then display the selected arms.

In FIG. 9P, server 112 may generate a notification that the young learner's character or avatar is complete. It should be noted that the example seen in FIGS. 9A-9P is non-limiting. Any combination of character features, accessories, or any additional characteristics of these (e.g., colors of features or accessories) may be included within the disclosed embodiments, and associated strings may be stored and generated in association within the character, the accessories, or the characteristics (e.g., a different color for the features would include an additional string to be concatenated to the string stored in memory).

Thus, as each new character feature or accessory, or characteristic of that feature or accessory, is received (which the young learner may easily remember), an alphanumeric string is created, or a segment of the alphanumeric string is concatenated to an existing alphanumeric string creating, by the server, a complex identifier and/or password for the young learner to authenticate to the system, which may be used to authenticate the user within the disclosed system, or within other systems configured to authenticate users.

To accomplish this, server 112 may execute a hash function to create a hash, or otherwise encrypt or add additional security to the string generated by the selection of the character, features, accessories, and/or characteristics, and store the hash or other encrypted data within a data field in the secure password database in association with the young learner's account or profile. The disclosed system may then apply software authentication technologies, possibly software authentication technologies existing in systems other than that disclosed, to access and authenticate users to the disclosed system, as described in more detail below, or to other systems using software authentication technologies. Thus, by selecting the character and additional character components, the disclosed system may generate a complex password completely by the character selection.

In some embodiments, the complexity of the character selection may scale with the age of the young learner, and the visual design may be enhanced, so that the character/avatar and their accessories or characteristics become more complex as the young learner becomes older. For example, in the interest of a detailed disclosure, the steps shown in FIGS. 9A-9P demonstrate a very detailed selection of several features of a character or avatar used by a young learner. This level of detail may be applied to young learners at a primary or elementary level of education, and in even more advanced levels of primary or elementary education, additional details, such as colors or sizes, may be included to introduce even more complexity or level of detail, which may scale with the individual user.

Figure 10A:
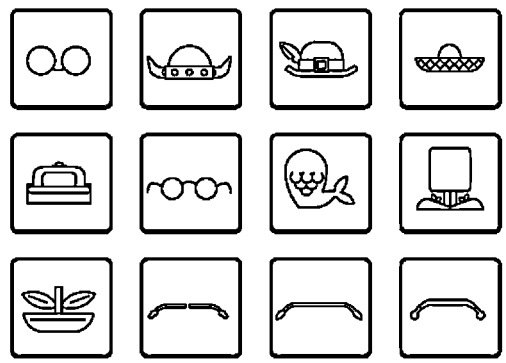
FIG. 10A illustrates a non-limiting example user interface allowing a young learner to access a secure system, using a secure authentication of young learners.
Figure 10B:
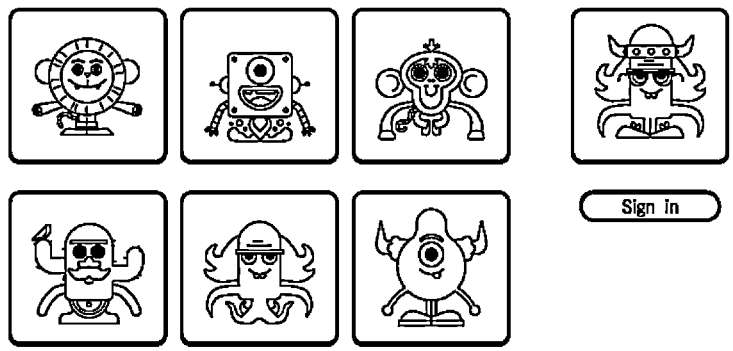
FIG. 10B illustrates a non-limiting example user interface allowing a young learner to access a secure system, using a secure authentication of young learners.
Figure 10B:
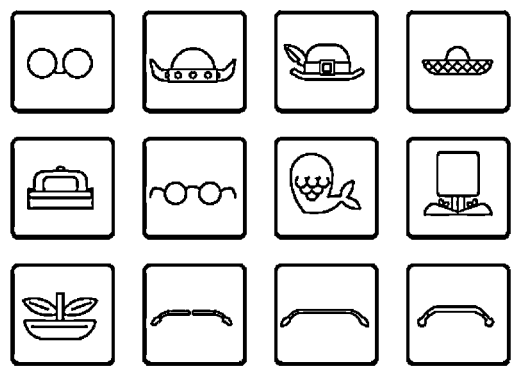

However, very young learners may require much less complex characters, with fewer accessories and details. As a non-limiting example, the user interfaces in FIGS. 10A-10B may be presented to users in pre-primary or pre-elementary classes (e.g., 3-5 year olds), while the user interfaces in FIGS. 9A-9P may be presented to primary or elementary classes (e.g., 6-11 year olds). As seen in FIGS. 10A-10B, the younger learner may only be required to create and select characters and accessories, rather than features and details about the character or accessories (e.g., eyes, mouth, hat, arms, legs, colors, etc.).

Although the level of detail available to users may differ according to user age, the underlying functionality would remain the same, wherein for each character, accessory and/or characteristic selected, the backend of the disclosed system would generate a segment of a password for the user to be stored in the password database.

Once the young learner has generated their user account or profile data, including a username and a secure password, as disclosed above, the young learner may use the generated username and password data to access systems requiring authentication. In some embodiments, the user's character/avatar may be used as a general login identifier, comprising both the username and the password. This would provide a totally independent authentication driven completely by the character selection, thereby simplifying the login process and possibly increasing young learner interest and engagement.

In embodiments that require both a username and password, server 112 may repeat the process disclosed above and demonstrated in FIGS. 6-8, selecting a letter associated with the username, and selecting the user's first name from a menu, in order to authenticate to a desired system. In all embodiments, the user may select their character, and possibly any associated accessories, as seen in FIGS. 10A and 10B.

The login information, whether username and selected character, or just selected character, may be transmitted to server 112. Server 112 may identify the young learner's account or profile, possibly using the selected username, and may identify the character, the accessories, and any additional features or characteristics, and select each associated string in the image/string correlation table 300 to generate a password string for the input selected character.

Server 112 may then apply the hash or other encryption or security algorithms to the generated password string, and compare the encrypted generated password string with the encrypted password string or hash stored in the secure password database table 310 in association with the young learner's account or profile. If the encrypted generated password string or hash matches the encrypted password or hash stored in the secure password table in association with the young learner's account, the young learner may be authenticated to the desired system.

Figure 11:
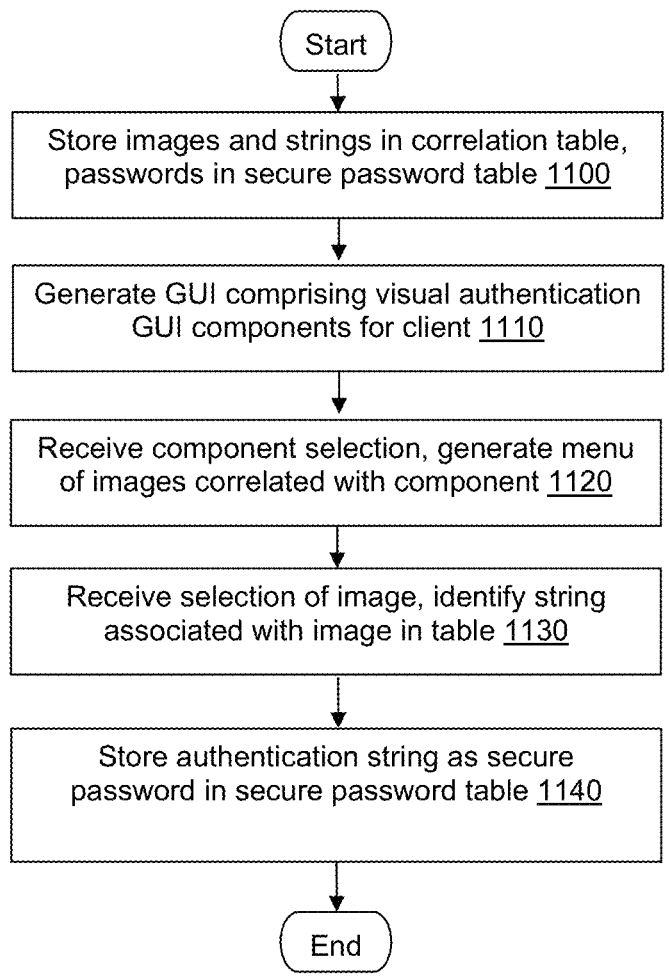
FIG. 11 illustrates a flow chart for a secure authentication of young learners.

In summary, FIG. 11 demonstrates a non-limiting example of the steps accomplished by the disclosed embodiments, which include a system comprising a server 112, a database 110, and a client computer 106 each coupled to a network 120. As seen in step 1100 of FIG. 11, server 112 may be configured to store, within database 110: a correlation table comprising a plurality of images; and a string associated with each of the plurality of images; and a secure password table. In step 1110, server 112 may generate a graphical user interface (GUI), configured to be transmitted to, and displayed on, a client device coupled to the network, the GUI comprising a plurality of GUI components for a visual authentication. In step 1120, server 112 may receive, from the client device, a selection of a component in the plurality of GUI components, and update the GUI to display a menu of images comprising a subset of the plurality of images associated in the correlation table with the component selected. In step 1130, server 112 may receive, from the client device, a second selection of an image in the menu of images, and identify, within the correlation table, the string associated with the image in the correlation table, as an authentication string. In step 1140, server 112 may then store the authentication string, as a secure password, in the secure password table.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:
a database coupled to a network and including:
   a correlation table comprising:
      a plurality of images; and
      a string associated with each of the plurality of images; and
   a secure password table;
a server comprising a computing device coupled to the network and comprising at least one processor executing instructions within memory which, when executed, cause the system to:
   generate a graphical user interface (GUI), configured to be transmitted to, and displayed on, a client device coupled to the network, the GUI comprising a plurality of GUI components for a visual authentication;
   receive, from the client device, a selection of a component in the plurality of GUI components;
   update the GUI to display a menu of images comprising a subset of the plurality of images associated in the correlation table with the component selected;
   receive, from the client device, a second selection of an image in the menu of images;
   identify, within the correlation table, the string associated with the image in the correlation table, as an authentication string;
   store the authentication string, as a secure password, in the secure password table;
   generate a second GUI, configured to be transmitted to, and displayed on, the client device, the second GUI comprising a menu of visual authentications including the visual authentication;
   receive, from the client device, a third selection from the menu of visual authentications;
   responsive to a determination that a second secure password generated from the third selection matches the secure password in the secure password table, authenticate the client device to the system;
   generate a third GUI, configured to be transmitted to, and displayed on, the client device, the third GUI comprising a menu of letters of the alphabet;
   receive, from the client device, a fourth selection of a letter from the menu;
   select, from a user account table in the database, a first name beginning with the letter;
   update the third GUI to display the first name and at least one additional first name generated from a library of first names;
   receive, from the client device, a fifth selection from the third GUI; and
   responsive to a determination that the fifth selection is associated in the database with the secure password, authenticate the client device to the system.

2. The system of claim 1, wherein the instructions further cause the system to:
   receive, from the client device, a sixth selection of a second component in the plurality of GUI components;
   update the GUI to display a second menu of images comprising a second subset of the plurality of images associated in the correlation table with the second component selected;
   receive, from the client device, a seventh selection of a second image in the second menu of images;
   identify, within the correlation table, the string associated with the second image in the correlation table;
   concatenate the string associated with the second image to the authentication string; and update, within the secure password table, the secure password to include the authentication string with a concatenation of the string associated with the second image.

3. The system of claim 1, wherein the instructions further cause the system to:
execute a hash or encryption function on the authentication string; and
store a hash or encrypted password generated from the hash or encryption function as the secure password in the secure password table.

4. The system of claim 1, wherein the instructions further cause the system to, responsive to receiving the second selection, update the plurality of GUI components for the visual authentication to include the image selected.

5. A method comprising:
storing, by a server comprising a computing device coupled to a network and comprising at least one processor executing instructions within memory, within a database coupled to the network:
   a correlation table comprising:
      a plurality of images; and
      a string associated with each of the plurality of images; and
   a secure password table;
generating, by the server, a graphical user interface (GUI), configured to be transmitted to, and displayed on, a client device coupled to the network, the GUI comprising a plurality of GUI components for a visual authentication;
receiving, by the server, from the client device, a selection of a component in the plurality of GUI components;
updating, by the server, the GUI to display a menu of images comprising a subset of the plurality of images associated in the correlation table with the component selected;
receiving, by the server, from the client device, a second selection of an image in the menu of images;
identifying, by the server, within the correlation table, the string associated with the image in the correlation table, as an authentication string;
storing, by the server, the authentication string, as a secure password, in the secure password table;
generating, by the server, a second GUI, configured to be transmitted to, and displayed on, the client device, the second GUI comprising a menu of visual authentications including the visual authentication;
receiving, by the server from the client device, a third selection from the menu of visual authentications;
responsive to a determination that a second secure password generated from the third selection matches the secure password in the secure password table, authenticating by the server, the client device to the system;
generating, by the server, a third GUI, configured to be transmitted to, and displayed on, the client device, the third GUI comprising a menu of letters of the alphabet;
receiving, by the server from the client device, a fourth selection of a letter from the menu;
selecting, by the server from a user account table in the database, a first name beginning with the letter;
updating, by the server, the third GUI to display the first name and at least one additional first name generated from a library of first names;
receiving, by the server from the client device, a fifth selection from the third GUI; and responsive to a determination that the fifth selection is associated in the database with the secure password, authenticating, by the server, the client device to the system.

6. The method of claim 5, further comprising the steps of:
receiving, by the server from the client device, a sixth selection of a second component in the plurality of GUI components;
updating, by the server, the GUI to display a second menu of images comprising a second subset of the plurality of images associated in the correlation table with the second component selected;
receiving, by the server from the client device, a seventh selection of a second image in the second menu of images;
identifying, by the server within the correlation table, the string associated with the second image in the correlation table;
concatenating, by the server, the string associated with the second image to the authentication string; and
updating, by the server within the secure password table, the secure password to include the authentication string with a concatenation of the string associated with the second image.

7. The method of claim 5, further comprising the steps of:
executing, by the server, a hash or encryption function on the authentication string; and
storing, by the server, a hash or encrypted password generated from the hash or encryption function as the secure password in the secure password table.

8. The method of claim 5, further comprising the step of, responsive to receiving the second selection, updating, by the server, the plurality of GUI components for the visual authentication to include the image selected.

9. A system comprising a server comprising a computing device coupled to a network and comprising at least one processor executing instructions within memory, the server being configured to:
store, within a database coupled to the network:
   a correlation table comprising:
      a plurality of images; and
      a string associated with each of the plurality of images; and
   a secure password table;
generate a graphical user interface (GUI), configured to be transmitted to, and displayed on, a client device coupled to the network, the GUI comprising a plurality of GUI components for a visual authentication;
receive, from the client device, a selection of a component in the plurality of GUI components;
update the GUI to display a menu of images comprising a subset of the plurality of images associated in the correlation table with the component selected;
receive, from the client device, a second selection of an image in the menu of images;
identify, within the correlation table, the string associated with the image in the correlation table, as an authentication string;
store the authentication string, as a secure password, in the secure password table;
generate a second GUI, configured to be transmitted to, and displayed on, the client device, the second GUI comprising a menu of visual authentications including the visual authentication;
receive, from the client device, a third selection from the menu of visual authentications;

responsive to a determination that a second secure password generated from the third selection matches the secure password in the secure password table, authenticate the client device to the system;

generate a third GUI, configured to be transmitted to, and displayed on, the client device, the third GUI comprising a menu of letters of the alphabet;

receive, from the client device, a fourth selection of a letter from the menu;

select, from a user account table in the database, a first name beginning with the letter;

update the third GUI to display the first name and at least one additional first name generated from a library of first names;

receive, from the client device, a fifth selection from the third GUI; and responsive to a determination that the fifth selection is associated in the database with the secure password, authenticate the client device to the system.

10. The system of claim 9, wherein the server is further configured to:

receive, from the client device, a sixth selection of a second component in the plurality of GUI components;

update the GUI to display a second menu of images comprising a second subset of the plurality of images associated in the correlation table with the second component selected;

receive, from the client device, a seventh selection of a second image in the second menu of images;

identify, within the correlation table, the string associated with the second image in the correlation table;

concatenate the string associated with the second image to the authentication string; and update, within the secure password table, the secure password to include the authentication string with a concatenation of the string associated with the second image.

11. The system of claim 9, wherein the server is further configured to:

execute a hash or encryption function on the authentication string; and store a hash or encrypted password generated from the hash or encryption function as the secure password in the secure password table.

12. The system of claim 9, wherein the server is further configured to, responsive to receiving the second selection, update the plurality of GUI components for the visual authentication to include the image selected.

* * * * *